United States Patent
Mok

(10) Patent No.: US 7,499,797 B2
(45) Date of Patent: Mar. 3, 2009

(54) METHOD AND DATABASE FOR NAVIGATING A PERSON FROM A STARTING POINT TO A DESTINATION

(75) Inventor: Swee M. Mok, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 95 days.

(21) Appl. No.: 11/610,822

(22) Filed: Dec. 14, 2006

(65) Prior Publication Data

US 2008/0147310 A1   Jun. 19, 2008

(51) Int. Cl.
  *H04Q 7/20* (2006.01)
  *G01C 21/00* (2006.01)
  *G06F 19/00* (2006.01)

(52) U.S. Cl. .................... 701/201; 701/213; 340/996; 455/456.3

(58) Field of Classification Search ................. 701/201, 701/202, 205, 206, 207, 209, 211, 213; 340/992, 340/996, 995.18, 995.28; 455/404.2, 456.1, 455/456.3, 456.5
See application file for complete search history.

(56) References Cited

U.S. PATENT DOCUMENTS

| | | | |
|---|---|---|---|
| 6,484,092 B2 | 11/2002 | Seibel | |
| 6,594,576 B2 | 7/2003 | Fan et al. | |
| 6,697,734 B1 * | 2/2004 | Suomela | 701/212 |
| 6,772,142 B1 * | 8/2004 | Kelling et al. | 707/3 |
| 6,961,562 B2 * | 11/2005 | Ross | 455/425 |
| 2006/0236257 A1 * | 10/2006 | Othmer et al. | 715/774 |
| 2007/0191026 A1 * | 8/2007 | Teplitsky | 455/456.3 |
| 2007/0211676 A1 * | 9/2007 | Sharma et al. | 370/338 |
| 2007/0282521 A1 * | 12/2007 | Broughton | 701/200 |

OTHER PUBLICATIONS http://www.nec-tokin.com/english/product/piezodevice2/ceramicgyro.html.
http://www.waag.org/realtime/en_frame.html.
http://project.waag.org/realtime/en_tech.html.
WIPO-ISA, PCT Search Report and Written Opinion.

* cited by examiner

*Primary Examiner*—Nguyen Q Tan

(57) ABSTRACT

An interactive system and method for navigating a person from a starting point to a destination, using a wireless location determining device and a wireless navigating device. The person sends a request for navigational directions via the wireless location determining device. Using a database that contains the geographic location and a corresponding name of the starting point and the destination, the request is answered and navigational information is sent to the wireless navigating device. The database was previously established by recording the movement of subjects, using a wireless location determining device, as the subjects moved from place to place in their environment. When the number of occurrences of subjects passing by any individual location reached a predetermined threshold, the subjects were prompted to enter a name that described and corresponded to that location. Using the provided navigational information, the person moves from the starting point toward the destination. Optionally, the wireless location determining device periodically sends the current geographic location of the person as he travels. Optionally the wireless location determining device periodically receives additional navigational information in response to the periodically sent information to update the person.

20 Claims, 3 Drawing Sheets

| LOCATION CO-ORDINATES | LOCATION NAME |
|---|---|
| X1Y1Z1 | Cafeteria |
| X2Y2Z2 | Meeting Room 1 |
| X3Y3Z3 | Meeting Room 2 |
| X4Y4Z4 | V.P. Jones office |
| X5Y5Z5 | H.R. Office |
| X6Y6Z6 | Ben Franklin Office |
| X7Y7Z7 | Drinking Fountain |
| X8Y8Z8 | ..... | ial intelligence systems, with some modifications.

METHOD AND DATABASE FOR NAVIGATING A PERSON FROM A STARTING POINT TO A DESTINATION

FIELD OF THE INVENTION

The present invention relates generally to methods and systems for navigating a user from a starting location to a final destination, using a database that has been previously established from the movements of subjects within a building.

BACKGROUND

In a pervasive computing environment, the availability of accurate and up-to-date maps of buildings and their internal spaces is essential for enabling location based commercial and emergency services. However, these maps are expensive to make and maintain. Traditional methods of mapping buildings rely on blue prints or drawings. Some problems with prior art methods are the difficulty of obtaining an accurate map to begin with, and the high cost of maintaining an accurate map over time. For example, employees in an office building frequently change their office or cubicle locations, certain offices may be physically eliminated, corridors may be added or removed, and new offices are continually added. The net result is that using physical maps to route users through a building will nearly always be inaccurate and out of date. The problem is especially acute in large, multi-story buildings such as government offices, corporate headquarters, etc. New employees or visitors who are not familiar with the layout of a facility have a particularly difficult time navigating these buildings. Although navigational systems for use in outdoor environments, such as hiking, driving, etc. have been commercially available, they all rely on manually digitized maps that are input to the system. While the input of such a large amount of data is a daunting task, it is a task that only needs to be performed once, as buildings, roads, cities, contains and other large physical structures in the outdoor environment rarely, if ever, move or disappear. However, this is not the case for the indoor environment, where scale is smaller and geography is dynamic. It would be a desired addition to the art if an easy, inexpensive method of dynamically creating map data could be used to guide individuals through buildings.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figures 1, 2:
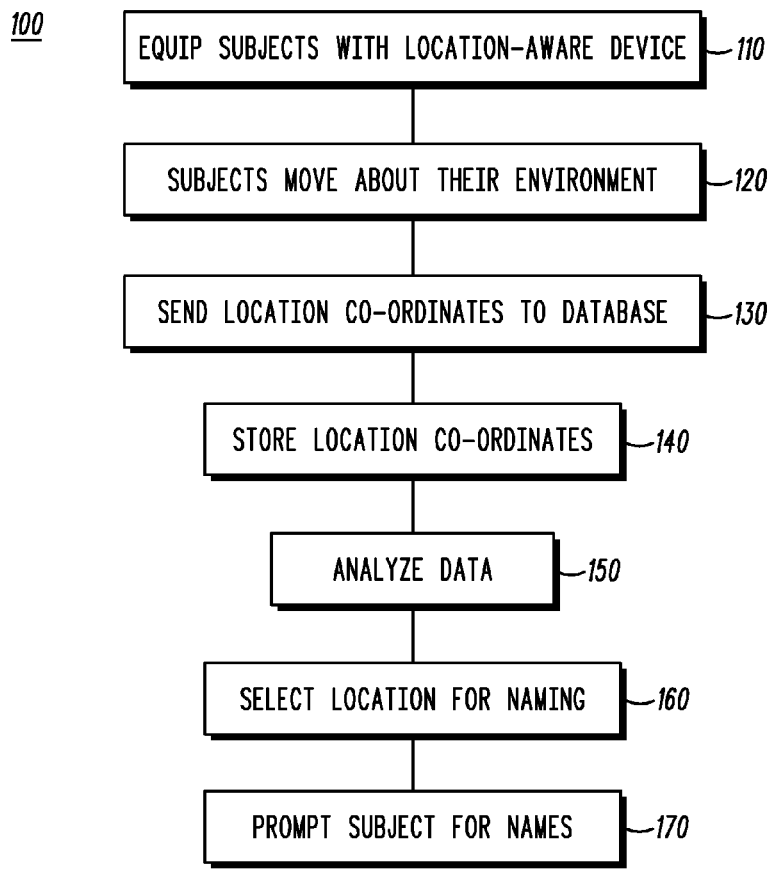
FIG. 1 is a flowchart depicting the method of dynamically creating a database of geographic locations and corresponding names in accordance with some embodiments of the invention.
FIG. 2 is an example of a portion of an array in the database of FIG. 1 in accordance with some embodiments of the invention.

Skilled artisans will appreciate that elements in the figures are illustrated for simplicity and clarity showing only those specific details that are pertinent to understanding the embodiments of the present invention.

DETAILED DESCRIPTION

Before describing in detail embodiments that are in accordance with the present invention, it should be observed that the embodiments reside primarily in combinations of method and apparatus components related to interactively navigating a person from a starting point to a destination, using a wireless location determining device and a wireless navigating device. Accordingly, the apparatus components and methods have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions involved in interactively navigating a person from a starting point to a destination as described herein. The non-processor circuits may include, but are not limited to, a radio receiver, a radio transmitter, signal drivers, clock circuits, power source circuits, and user input devices. As such, these functions may be interpreted as a method to interactively navigate a person from a starting point to a destination. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

An interactive system and method for navigating a person from a starting point to a destination uses a wireless location determining device, a wireless navigating device, and a database. The person sends a request for navigational directions via the wireless location determining device. Using a database that contains the geographic location and a corresponding name of the starting point and destination, the request is answered and navigational information is sent to the wireless navigating device. The database was previously established by recording the movement of subjects, using a wireless location determining device, as the subjects moved from place to place in their environment. When the number of occurrences of subjects passing by any individual location reached a predetermined threshold, the subjects were prompted to enter a name that described and corresponded to that location. Using the provided navigational information, the person moves from the starting point toward the destination. Optionally, the wireless location determining device can periodically send the current geographic location of the person as he travels. Optionally, the wireless location determining device can periodically receive new navigational information to update the person.

Referring now to FIG. 1, a database 100 of geographic locations and corresponding names is created by equipping one or more subjects 110 with a location-aware device that is capable of recording their visited locations, such as a Global Positioning System (GPS) receiver, an inertial navigation system, a wireless local area network client, or any other wireless device capable of creating information that defines a particular location and can be transmitted. The subjects can be volunteers or paid users. As the subjects move about their environment 120, for example, an office building during work hours, they carry this wireless location determining device (WLDD), with them. The WLDD periodically or continuously creates and transmits 130, for example, location co-ordinates in two dimensional format (X-Y location) or three dimensional format (X-Y-Z location). Two dimensional format can be used in situations where all the subject's activities are confined to a limited vertical distance, for example in a one floor building. Three dimensional format can be used in situations where the subjects move about from one floor to another, as in a multi-story building. In the case of the familiar GPS transmitter, latitude, longitude, and vertical height co-ordinates are created, defining a unique point on or above the surface of the Earth. Over a period of time, as each subject moves about their environment, a large number of geographic locations will be created or defined, and all of these geographic locations is stored in a database 140. In the case of multiple subjects, the database will contain even larger numbers of stored geographic locations. Ultimately, a record of all the building's pathways, meeting rooms, offices, communal areas, etc. that are visited by the human subjects will be stored in the database, and this matrix of geographic locations could be used, for example, to create a virtual map of the building. Clearly, larger numbers of subjects and longer time periods for collecting data will produce more precise and detailed portrayals of the building. An analysis 150 of the database will reveal that some geographic locations have been visited more often than others, and some have been rarely visited. Those geographic locations that meet a predetermined threshold of number of visits are selected 160 to be identified with a name that is understandable and readily recognized by human users of the area. The next time the subjects visit a selected geographic location they are then prompted to submit a name 170 for that location, and may do so either manually or via an electronic input device, such as the WLDD. Thus, each important geographic location also has associated with it a corresponding user decipherable location name, as shown in FIG. 2. Places that are not visited often enough to meet the threshold criteria are probably not important, but can still be manually named by an administrator, if desired.

Figure 3:
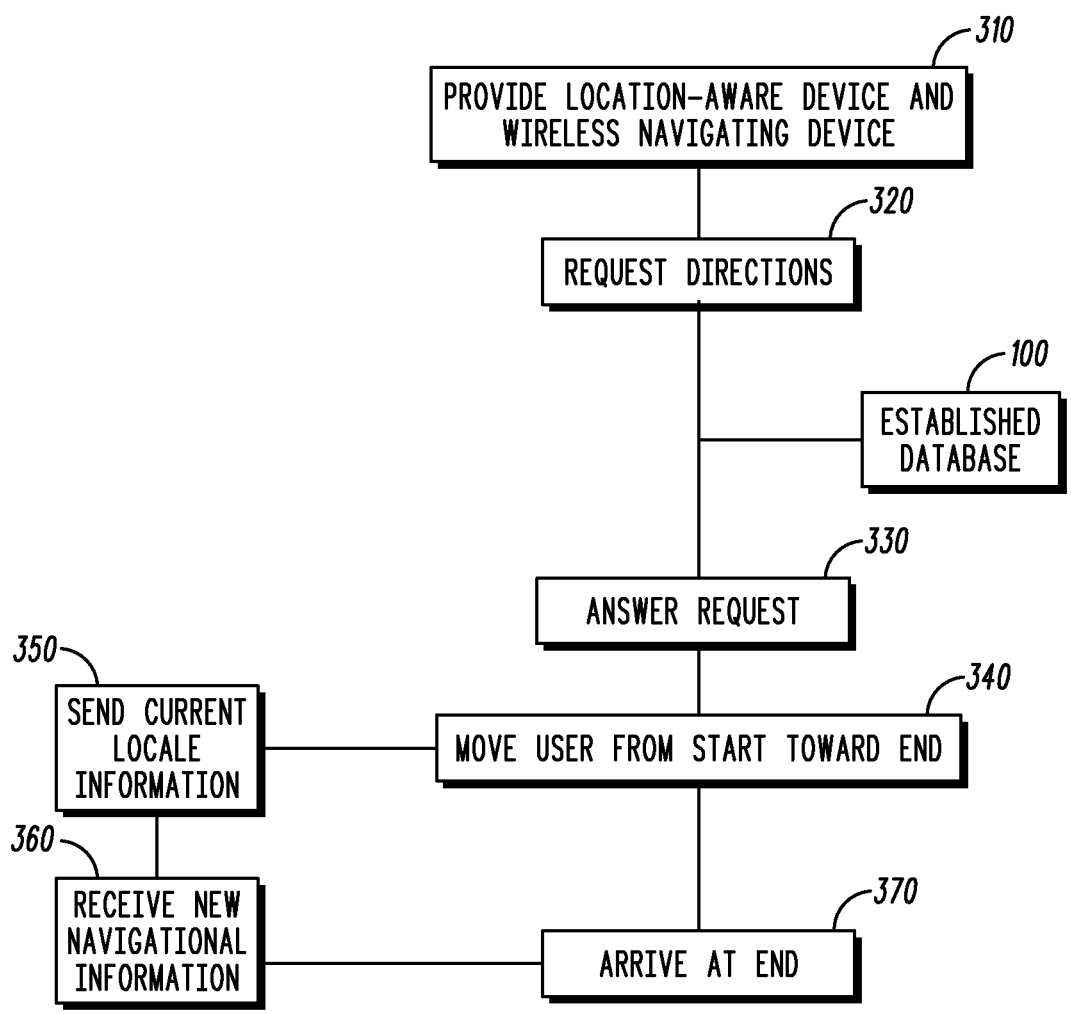
FIG. 3 is a flowchart depicting an interactive system and method for navigating a person from a starting point to a destination, using a wireless location determining device, a wireless navigating device, and a database, in accordance with some embodiments of the invention.

Referring now to FIG. 3, a user who wishes to move from a starting locale or point to a final locale or destination carries with him 310 a wireless location determining device and a wireless navigating device. The two devices can be individual units, or they can be combined into a single unit. For example they may be integrated as part of a cellular telephone or a personal digital assistant. The user might be a visitor to a large government office building who is not familiar with the layout of the building and who needs to go from the entrance lobby to a meeting room. The user inputs a request for directions or navigational instructions via the WLDD 320 that contains the geographic location of the starting local and the name of final locale. The present geographic location is matched to one or more corresponding locations in the previously established database 100, and navigational information that can be used to route the user from the present geographic location to the final locale is compiled. The navigational information is then transmitted to the wireless navigating device, answering 330 the request for instructions. The instructions might consist of a map displayed on a liquid crystal display, as in a GPS display, or it might be a series of commands that indicates how to proceed from waypoint to waypoint. The commands can be either verbal or written, and would indicate direction and distance between waypoints. The user then begins to travel 340 from the starting point toward the destination by following the navigational information. As the user travels from the starting locale to the final locale, the wireless location determining device periodically sends information comprising the current geographic location of the user 350. Optionally, the wireless location determining device periodically receives additional navigational information 360 in response to the periodically sent information, to update the user as to his location and progress. Having proceeded from the starting locale via the waypoints to the ending locale, the user arrives at his destination 370, and optionally receives an arrival confirmation from the wireless navigating device.

Figure 4:
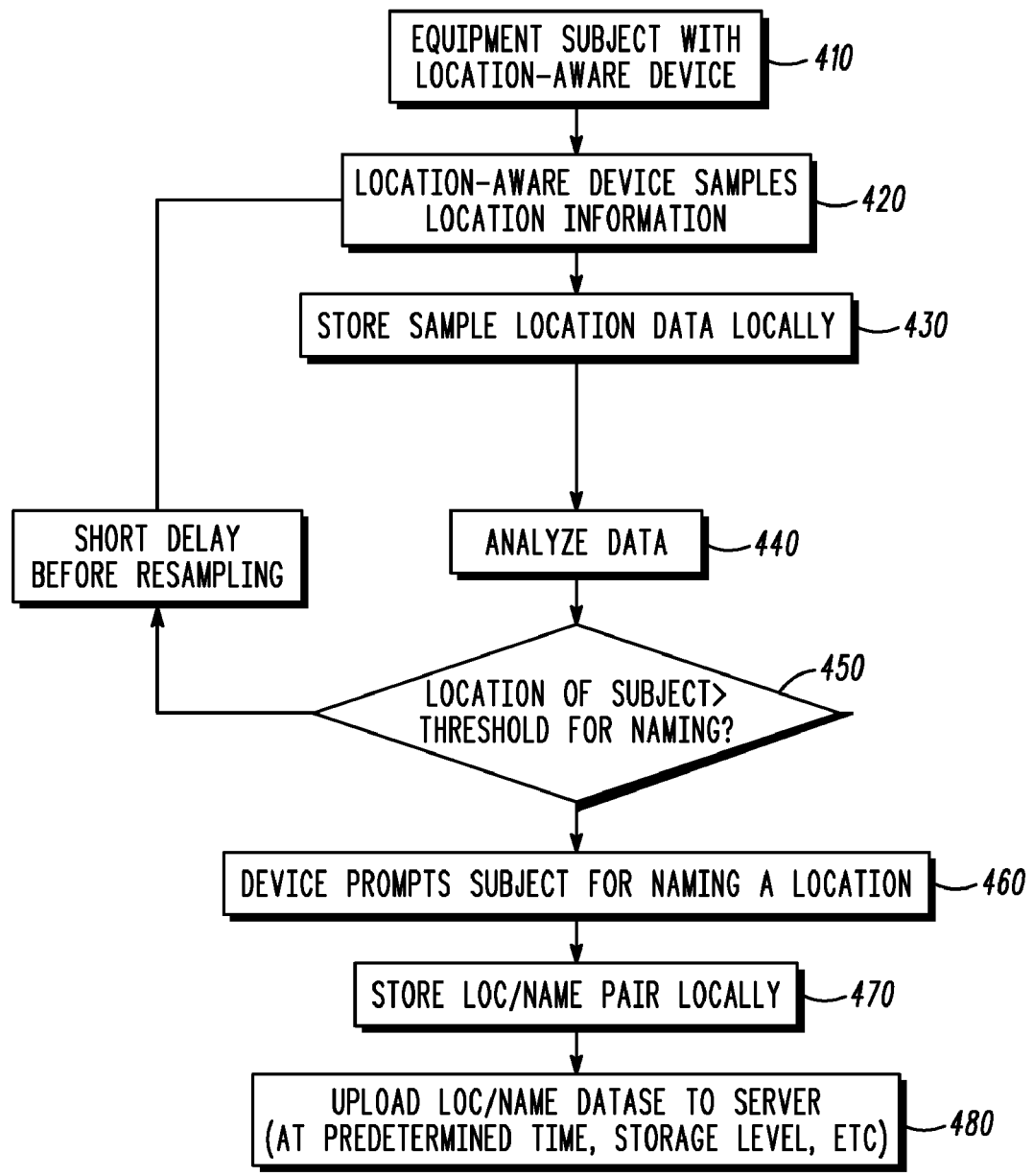
FIG. 4 is a flowchart depicting the method of creating a database of geographic locations and corresponding names in accordance with some embodiments of the invention.

Referring now to FIG. 4, an interactive method of creating a mapping database uses a plurality of users 410, each equipped with a location-aware device. As the users move about their environment, each of their location-aware devices periodically samples the user's present location 420, and stores the sampled information locally on the individual user's device 430. After a certain amount of time has elapsed, for example, one week or one month, or after a certain amount of data has been stored, the sampled location information is transferred to a remote processor for analysis 440, to determine whether or not various subsets of the sampled locations contain enough occurrences of a single location to meet a predetermined threshold for naming 450. If the threshold is met, then those users who have previously visited that location are prompted via their location-aware device to enter a name that corresponds to that location 460. Their names should be a common sense name and be readily recognizable and understandable to others who might later visit the location. The entered name is temporarily stored on the location-aware device 470 and periodically batch uploaded to the remoter processor 480. Optionally, the process is repeated numerous times to insure that the mapping database is always up to date. Optionally, an administrator can delete old names that are no longer consistent with reality, or old names that have been replaced with newer user-input names.

Referring again to FIG. 4, an alternate embodiment of an interactive method of creating a mapping database again uses a plurality of users 410, each equipped with a location-aware device. As the users move about their environment, each of their location-aware devices periodically samples the user's present location 420, and stores the sampled information locally on the individual user's device 430. After a certain amount of time has elapsed, for example, one week or one month, or after a certain amount of data has been stored, the sampled location information is analyzed 440 on each individual user's location-aware device, to determine whether or not various subsets of the sampled locations contain enough occurrences at a single location to meet a predetermined threshold for naming 450. If the threshold is met, then the user is prompted via their location-aware device to enter a name that corresponds to that location 460. Their names should be a common sense name and be readily recognizable and understandable to others who might later visit the location. The entered name is temporarily stored on the location-aware device 470 and periodically batch uploaded to the remoter processor 480. Optionally, the process is repeated numerous times to insure that the mapping database is always up to date. Optionally, an administrator can delete old names that are no longer consistent with reality, or old names that have been replaced with newer user-input names.

In summary, this interactive method and system does not depend on traditional mapping processes to generate information that can describe the physical layout of buildings and internal structures. Instead, it uses the historical behavior (i.e. movement) of multiple subjects in an area of interest over a period of time to create a database by acquiring information regarding the geographic locations using mobile data collection devices to capture the various movements of the subjects. The database is then used as a 'virtual map' to aid users in navigating from one location to another.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An interactive method of navigating a human user from a starting locale to a final locale, comprising:

providing, to the human user, a wireless location determining device and a wireless navigating device;

the human user, at the starting locale, sending a request via the wireless location determining device, for navigational directions from the starting locale to the final locale;

using a database comprising a geographic location and a corresponding human user decipherable location name of the starting locale and comprising a geographic location and a corresponding human user decipherable location name of the final locale, answering the request by providing navigational information to the wireless navigating device sufficient to enable the human user to move toward the final locale, wherein the database further comprises a plurality of geographic locations, each with one or more corresponding user decipherable location names, the plurality of geographic locations having been established by previously recording the movement of human subjects using a wireless location determining device as the human subjects moved about their environment, the human user decipherable location names of each of the plurality of geographic locations having been provided by the human subjects; and the human user, following the provided navigational information, moving from the starting locale toward the final locale.

2. The interactive method of navigating as described in claim 1, wherein the database comprises three dimensional geographic locations.

3. The interactive method of navigating as described in claim 1, further comprising the wireless location determining device periodically sending information comprising the current geographic location of the human user as the human user moves from the starting locale to the final locale.

4. The interactive method of navigating as described in claim 3, further comprising the wireless location determining device periodically receiving additional navigational information in response to the periodically sent information.

5. The interactive method of navigating as described in claim 1, wherein the wireless location determining device and the wireless navigating device comprise a single unit.

6. The interactive method of navigating as described in claim 5, wherein the wireless location determining device and the wireless navigating device comprise a cellular telephone or a personal digital assistant.

7. The interactive method of navigating as described in claim 1, wherein the wireless location determining device comprises a Global Positioning System receiver, an inertial navigation system, or wireless local area network client.

8. The interactive method of navigating as described in claim 1, wherein the starting locale and the final locale are within a building.

9. The interactive method of navigating as described in claim 1, wherein the movements of the human user are outside of a building.

10. The interactive method of navigating as described in claim 1, wherein when the movement of human subjects about a particular geographic location reaches a predetermined threshold, a geographic location is established.

11. The interactive method of navigating as described in claim 10, wherein when the geographic location is established, the human subjects are prompted to provide a human user decipherable location name for the established geographic location.

12. An interactive system for navigating a human user from a starting locale to a final locale, comprising:

a wireless location determining device for providing information regarding the locale of a human user;

a wireless navigating device for providing information to the human user on how to navigate from the starting locale to the final locale;

a database comprising a plurality of geographic locations and corresponding human user decipherable location names, including those of the starting locale and of the final locale, wherein the database has previously been established by recording the movement of human subjects using a wireless location determining device as the human subjects moved about their environment, the human user decipherable location names of each of the plurality of geographic locations having been provided by the subjects;

receiving means for receiving the provided information regarding the position of a human user;

processing means for determining the navigational route from the starting locale to the final locale; and sending means for sending the navigational route to the wireless navigating device.

13. The interactive system for navigating as described in claim 12, wherein the wireless location determining device and the wireless navigating device comprise a single unit.

14. The interactive system for navigating as described in claim 13, wherein the wireless location determining device and the wireless navigating device comprise a cellular telephone or a personal digital assistant.

15. The interactive system for navigating as described in claim 12, wherein the wireless location determining device comprises a Global Positioning System receiver, an inertial navigation system, or wireless local area network client.

16. The interactive system for navigating as described in claim 12, wherein the starting locale and the final locale are within a building.

17. A database for navigating a human user from a starting locale to a final locale, comprising a plurality of geographic locations and corresponding human user decipherable location names, including those of the starting locale and of the final locale, wherein the database has previously been established by recording the movement of human subjects using a wireless location determining device as the human subjects moved about their environment, the human user decipherable location names of some of the plurality of geographic locations having been provided by the subjects.

18. The database as described in claim 17, wherein a predetermined number of occurrences of human subjects moving about a single geographic location must take place before the single geographic location is established.

19. The database as described in claim 17, wherein the human user decipherable location names of some of the plurality of geographic locations is provided by an administrator.

20. The database as described in claim 17, wherein when the geographic location is established, the human subjects are prompted to provide a human user decipherable location name for the established geographic location.

* * * * *